United States Patent
Sammour et al.

(10) Patent No.: US 11,849,393 B2
(45) Date of Patent: *Dec. 19, 2023

(54) METHOD AND APPARATUS FOR TRANSMISSION MANAGEMENT IN A WIRELESS COMMUNICATION SYSTEM

(71) Applicant: INTERDIGITAL TECHNOLOGY CORPORATION, Wilmington, DE (US)

(72) Inventors: Mohammed Sammour, Alrabieh-Amman (JO); Sudheer A. Grandhi, Pleasanton, CA (US); Robert L. Olesen, New York, NY (US)

(73) Assignee: INTERDIGITAL TECHNOLOGY CORPORATION, Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 17/963,030

(22) Filed: Oct. 10, 2022

(65) Prior Publication Data

US 2023/0032892 A1  Feb. 2, 2023

Related U.S. Application Data

(63) Continuation of application No. 17/130,291, filed on Dec. 22, 2020, now Pat. No. 11,470,552, which is a
(Continued)

(51) Int. Cl.
*H04W 52/02* (2009.01)
*H04J 3/06* (2006.01)
(Continued)

(52) U.S. Cl.
CPC ....... *H04W 52/0219* (2013.01); *H04J 3/0605* (2013.01); *H04W 52/0216* (2013.01);
(Continued)

(58) Field of Classification Search
CPC ........ H04W 52/0219; H04W 52/0216; H04W 72/21; H04W 72/23; H04W 72/30;
(Continued)

(56) References Cited

U.S. PATENT DOCUMENTS

| 6,094,426 A | 7/2000 | Honkasalo et al. |
| 6,366,761 B1 | 4/2002 | Montpetit |

(Continued)

FOREIGN PATENT DOCUMENTS

| CN | 1501646 A | 6/2004 | |
| GB | 2404308 A | * 1/2005 | .......... H04W 74/002 |

(Continued)

OTHER PUBLICATIONS

IEEE, "Draft Amendment to Standard [For] Information Technology Telecommunications and Information Exchange between Systems—Local and Metropolitan Networks—Specific Requirements-Part 11: Wireless LAN Medium Access Control (MAC) and Physical Layer (PHY) Specifications: Enhancements for Higher Throughput", IEEE P802.11n™/D0.01, Jan. 2006, 191 pages.

(Continued)

*Primary Examiner* — Brandon J Miller
(74) *Attorney, Agent, or Firm* — Volpe Koenig

(57) ABSTRACT

A method and apparatus may be used in wireless communications. The apparatus may be an access point (AP), and may transmit a power save frame. The power save frame may include one or more Uplink (UL) Transmission Times (ULT)s. The apparatus may determine that a station (STA) did not transmit during its respective ULT. The AP may transmit another power save frame. The other power save frame may include a modified ULT. The modified ULT may be for a STA that did not transmit during its respective ULT.

(Continued)

The other power save frame may include an unmodified ULT. The unmodified ULT may be for a STA that did not transmit.

20 Claims, 11 Drawing Sheets

Related U.S. Application Data continuation of application No. 16/854,331, filed on Apr. 21, 2020, now Pat. No. 10,873,907, which is a continuation of application No. 16/531,942, filed on Aug. 5, 2019, now Pat. No. 10,631,244, which is a continuation of application No. 16/173,540, filed on Oct. 29, 2018, now Pat. No. 10,375,635, which is a continuation of application No. 15/583,435, filed on May 1, 2017, now Pat. No. 10,117,179, which is a continuation of application No. 14/135,758, filed on Dec. 20, 2013, now Pat. No. 9,681,377, which is a continuation of application No. 11/533,072, filed on Sep. 19, 2006, now Pat. No. 8,619,658.

(60) Provisional application No. 60/736,255, filed on Nov. 14, 2005, provisional application No. 60/720,967, filed on Sep. 27, 2005, provisional application No. 60/719,035, filed on Sep. 21, 2005.

(51) Int. Cl.
*H04W 74/04* (2009.01)
*H04W 72/21* (2023.01)
*H04W 72/23* (2023.01)
*H04W 72/30* (2023.01)
*H04L 43/10* (2022.01)
*H04W 74/06* (2009.01)

(52) U.S. Cl.
CPC .......... *H04W 72/21* (2023.01); *H04W 72/23* (2023.01); *H04W 72/30* (2023.01); *H04W 74/04* (2013.01); *H04L 43/10* (2013.01); *H04W 74/06* (2013.01); *Y02D 30/70* (2020.08)

(58) Field of Classification Search
CPC ..... H04W 74/04; H04W 74/06; H04W 24/10; H04W 28/04; H04J 3/0605; H04L 43/10; Y02D 30/70
See application file for complete search history.

(56) References Cited

U.S. PATENT DOCUMENTS

| | | | |
|---|---|---|---|
| 7,599,340 B2 | 10/2009 | Chandra et al. | |
| 7,881,322 B1 | 2/2011 | Benveniste | |
| 8,619,658 B2 * | 12/2013 | Sammour | H04W 72/23 455/574 |
| 9,681,377 B2 * | 6/2017 | Sammour | H04W 72/30 |
| 10,117,179 B2 * | 10/2018 | Sammour | H04W 52/0216 |
| 10,375,635 B2 * | 8/2019 | Sammour | H04W 72/23 |
| 10,631,244 B2 * | 4/2020 | Sammour | H04W 52/0219 |
| 10,873,907 B2 * | 12/2020 | Sammour | H04W 72/23 |
| 11,470,552 B2 * | 10/2022 | Sammour | H04W 72/23 |
| 2001/0036831 A1 | 11/2001 | Rezaiifar et al. | |
| 2002/0093940 A1 | 7/2002 | Toskala et al. | |
| 2002/0120740 A1 | 8/2002 | Ho et al. | |
| 2003/0012163 A1 | 1/2003 | Cafarelli et al. | |
| 2003/0157949 A1 | 8/2003 | Sarkkinen et al. | |
| 2003/0185241 A1 | 10/2003 | Lu et al. | |
| 2004/0203808 A1 | 10/2004 | Mathur | |
| 2005/0025114 A1 | 2/2005 | Ware et al. | |
| 2005/0117526 A1 | 6/2005 | Melnik | |
| 2005/0135295 A1 | 6/2005 | Walton et al. | |
| 2005/0136833 A1 | 6/2005 | Emeott et al. | |
| 2005/0138451 A1 | 6/2005 | Simpson et al. | |
| 2006/0092871 A1 | 5/2006 | Nishibayashi et al. | |
| 2006/0171341 A1 | 8/2006 | Wang et al. | |
| 2013/0287043 A1 | 10/2013 | Nanda et al. | |
| 2014/0112230 A1 | 4/2014 | Sammour et al. | |

FOREIGN PATENT DOCUMENTS

| | | |
|---|---|---|
| JP | 11-69431 | 3/1999 |
| KR | 10-2002-0095251 | 12/2002 |
| KR | 2004-0072815 | 8/2004 |
| KR | 2004-0104776 | 12/2004 |
| KR | 10-2006-0090258 | 8/2006 |
| TW | I436673 | 5/2014 |
| WO | 2005/039127 | 4/2005 |

OTHER PUBLICATIONS

IEEE, "Draft Amendment to Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications; Amendment: Enhancements for Higher Throughput", IEEE 802.11n/D1.02, Jul. 2006.
IEEE, "IEEE Wireless LAN Edition—A Compilation Based on IEEE Std 802.11 TM-1999 (R2003) and Its Amendments", 2003, pp. 1-705.
IEEE, "Telecommunications and Information Exchange Between Systems—Local and Metropolitan Area Networks—Specific Requirements, Part 11: Wireless Medium Access Control (MAC) and Physical Layer (PHY) Specifications: Amendment 7: Medium Access Control (MAC) Quality of Services (QoS) Enhancements", IEEE P802.11e/D9.0, Aug. 2004.
IEEE, "Telecommunications and Information Exchange Between Systems—Local and Metropolitan Area Networks—Specific Requirements, Part 11: Wireless LAN Medium Access Control (MAC) and Physical Layer (PHY) Specifications; Amendment 4: Further Higher Data Rate Extension in the 2.4 Ghz Band", Jun. 27, 2003.
Jang et al., "Samsung MAC Proposal Technical Specification", IEEE 802.11-04-0918-00-000n, Aug. 2004.
Kose et al., "\MNiSE Proposal: High Throughput Extension to the 802.11 Standard", IEEE 802.11-05/0149r5, Mar. 18, 2005, 1OS pages.
Kose et al., "\MNiSE Proposal: High Throughput Extension to the 802.11 Standard", IEEE 802.11-05/0149r1, Jan. 6, 2005.
Mujtaba et al., "TGn Sync Proposal Technical Specification", IEEE 802.11-04/0889r6, May 18, 2005, 131 pages.
Mujtaba et al., "TGn Sync Proposal Technical Specification", IEEE 802.11-04/0889r5, May 13, 2005, 131 pages.
Mujtaba, Syed Aon, "TGn Sync Proposal Technical Specification", IEEE 802.11-04/0889r2, IEEE P802.11 Wireless LANs, Jan. 2005, 152 pages.
Mujtaba, Syed Aon, "TGn Sync Proposal Technical Specification", IEEE 802.11-04/0889r7, Jul. 8, 2005, 7 pages.

* cited by examiner

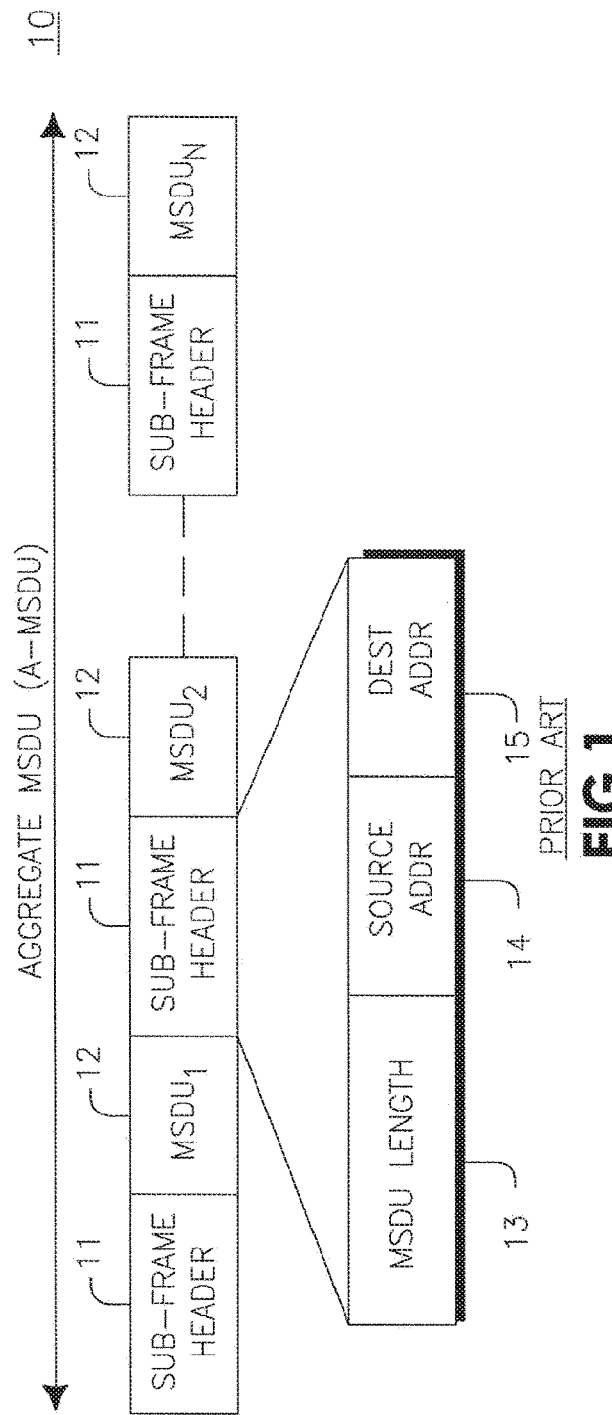
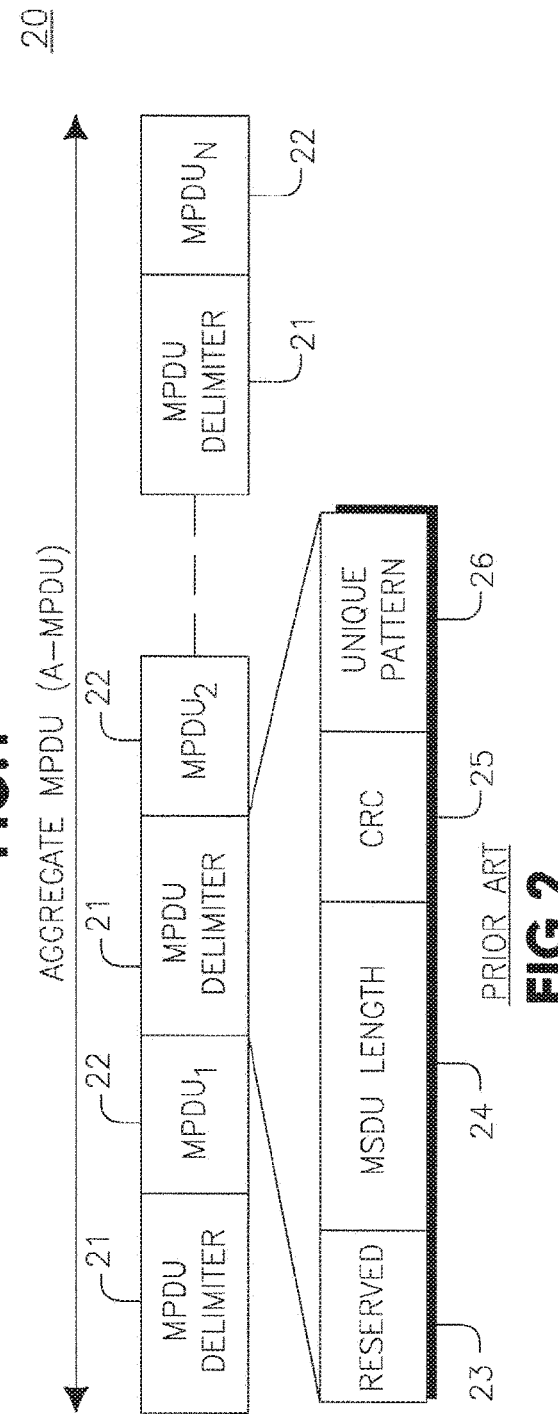

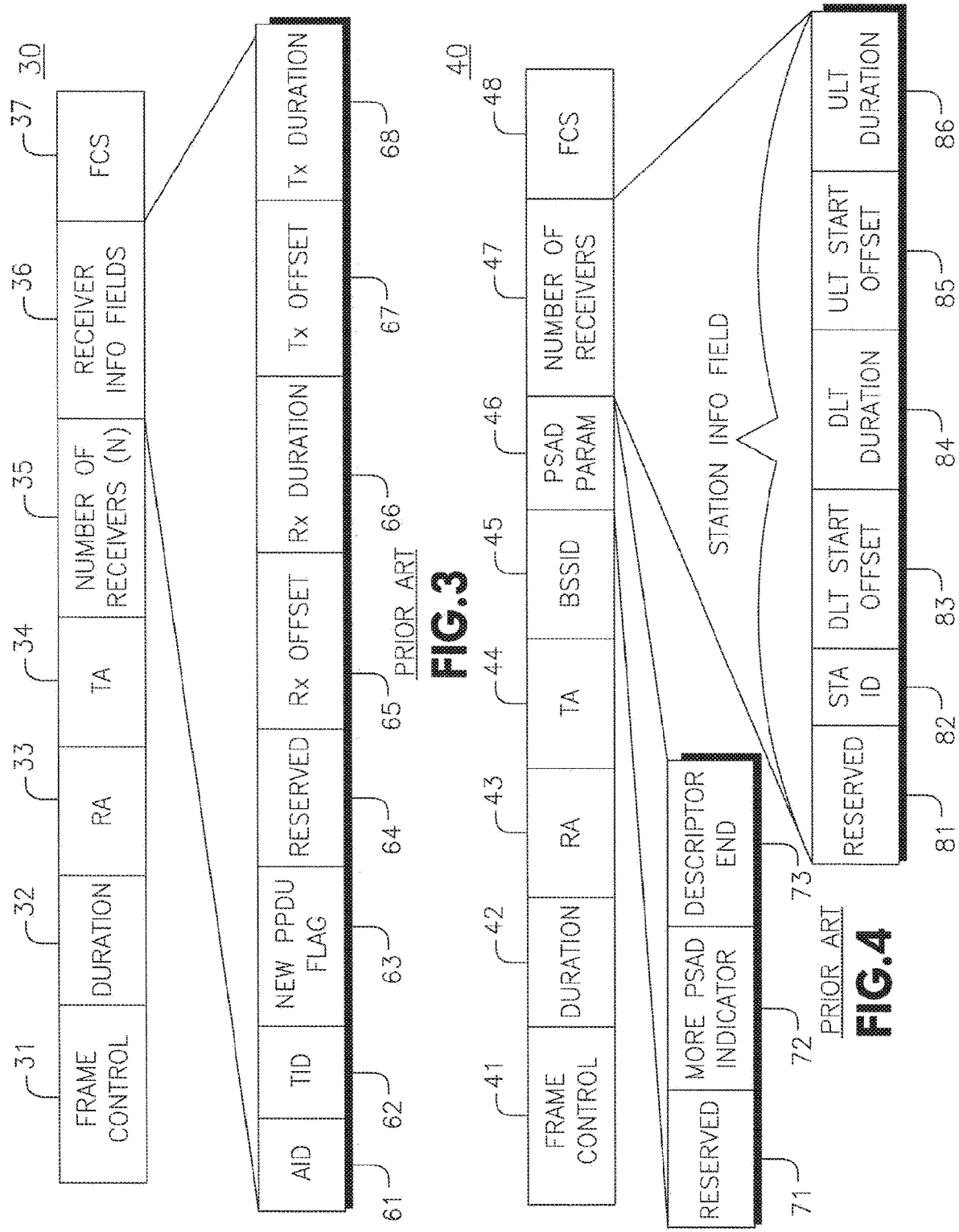

METHOD AND APPARATUS FOR TRANSMISSION MANAGEMENT IN A WIRELESS COMMUNICATION SYSTEM

CROSS REFERENCE TO RELATED APPLICATIONS

This application is a continuation of U.S. patent application Ser. No. 17/130,291 filed Dec. 22, 2020, which is a continuation of U.S. patent application Ser. No. 16/854,331, filed Apr. 21, 2020, which issued as U.S. Pat. No. 10,873,907 on Dec. 22, 2020, which is a continuation of U.S. patent application Ser. No. 16/531,942, filed Aug. 5, 2019, which issued as U.S. Pat. No. 10,631,244 on Apr. 21, 2020, which is a continuation of Ser. No. 16/173,540, filed Oct. 29, 2018, which issued as U.S. Pat. No. 10,375,635 on Aug. 6, 2019, which is a continuation of U.S. patent application Ser. No. 15/583,435, filed May 1, 2017, which issued as U.S. Pat. No. 10,117,179 on Oct. 30, 2018, which is a continuation of U.S. patent application Ser. No. 14/135,758 filed Dec. 20, 2013, which issued as U.S. Pat. No. 9,681,377 on Jun. 13, 2017, which is a continuation of U.S. patent application Ser. No. 11/533,072 filed Sep. 19, 2006, which issued as U.S. Pat. No. 8,619,658 on Dec. 31, 2013, which claims the benefit of U.S. Provisional Application No. 60/719,035, filed Sep. 21, 2005, U.S. Provisional Application No. 60/720,967, filed Sep. 27, 2005, and U.S. Provisional Application No. 60/736,255, filed Nov. 14, 2005, the contents of which are hereby incorporated by reference.

FIELD OF INVENTION

The present invention is related data transmission in a wireless communication system. In particular, the present invention relates to a method and apparatus for transmission management for multiple polling and power saving in a wireless communication system.

BACKGROUND

The implementation of proposed IEEE 802.11 standards, and in particular the IEEE 802.11n standard, will allow for higher throughput (HT) wireless local area network (WLAN) devices. One such way in which higher throughput may be achieved is through the use of signal aggregation in both the medium access control (MAC) layer and the physical (PHY) layer. When an aggregate is addressed to a single receiver address, it is referred to as a Single Receiver Aggregate (SRA). When the aggregate is addressed to multiple receivers, it is referred to as a Multiple Receiver Aggregate (MRA).

An MRA may be transmitted during a Multiple Receiver Aggregate Multi-Poll (MMP) sequence or a Power Save Aggregation Descriptor (PSAD). This aggregation tends to improve system performance and also provides a power saving mechanism in the case of MMP/PSAD.

One or more MAC Service Data Units (MSDUs) being sent to the same receiver can be aggregated into a single Aggregate-MSDU (A-MSDU). This aggregation of more than one frame improves the efficiency of the MAC layer, particularly when there are many small MSDUs such as Transmission Control Protocol Acknowledgements (TCP ACKs). The overhead associated with channel access, such as the Physical Layer Convergence Protocol (PLCP) preamble, MAC header, and IFS spacing, can thereby be amortized over two or more MSDUs. Additionally, a STA may only use MSDU aggregation where it knows that the receiver supports MSDU aggregation. In some cases, support for MSDU aggregation may be mandatory at the receiver.

FIG. 1 shows an exemplary A-MSDU frame 10. The A-MSDU frame 10 includes a plurality of Sub-frame header fields 11 and a plurality of MSDU fields 12 (designated $MSDU_1 \ldots MSDU_n$). Each Sub-frame header field 11 includes an MSDU length field 13, a source address (Source Addr) field 14, and a destination address (Dest Addr) field 15. Typically, the sub-frame header fields 11 separate the MSDU to aid a receiver in deciphering whether or not the frame is directed toward it. Ordinarily, the MSDU length field 13 includes the length, the Source Addr field 14 includes the address of the transmitter, and the Dest Addr field 15 includes the address of the receiver. In general, to form an A-MSDU 10, two or more MSDUs are aggregated together.

Another type of aggregation may be formed by joining multiple MAC Protocol Data Units (MPDUs) together. FIG. 2 shows an exemplary aggregated MPDU (A-MPDU) frame 20. The A-MPDU frame 20 includes a plurality of MPDU delimiter fields 21 and a plurality of MPDU fields 22 (designated $MPDU_1 \ldots MPDU_n$). Each MPDU delimiter field 21 also includes a reserved field 31, an MSDU length field 24, a Cyclic Redundancy Check (CRC) field 25, and a Unique Pattern field 26. The A-MPDU frame 20 is typically transported in a single aggregate PLCP Service Data Unit (A-PSDU). Additionally, padding octets (not shown) are appended, if needed, to make each MPDU field 22 section a multiple of four octets in length, except in the case of $MPDU_n$.

One purpose of the MPDU delimiter field 21 is to delimit the MPDUs 22 within the aggregate. For example, the structure of the aggregate can usually be recovered when one or more MPDU delimiters are received with errors. Also, individual MPDU delimiter fields 21 have the same block error rate (BER) as the surrounding MPDUs 22, and can therefore be lost during transmission.

One advantage in using A-MPDU frames 20 is that, unlike A-MSDUs, they can be aggregated to multiple receivers. That is, a multiple-receiver aggregate (MRA) may contain MPDUs that are addressed to multiple receivers. Moreover, an MRA may be transmitted in one of two contexts that are distinguished by whether it is transmitted during an MMP/PSAD sequence or not. If multiple responses are required, they may be scheduled by transmission of an MMP or PSAD frame.

FIG. 3 shows a typical multiple receiver aggregate multi-poll (MMP) frame 30. The MMP frame 30 includes a frame control field 31, a duration field 32, a receiver address (RA) field 33, a transmitter address (TA) field 34, a number of receivers (N) field 35, a receiver information (info) field 36, and a frame checksequence (FCS) field 37. The RA field 33 is typically the broadcast address of a group. The TA field 34 is typically the address of the wireless transmit/receive unit (WTRU) transmitting the MRA aggregate. The number of receivers (N) field 35 includes the number of receivers for which MPDUs are included in the MRA aggregate.

Additionally, the receiver info field 36 includes a plurality of subfields, such as an association identifier (AID) field 61, a transmission identifier (TID) field 62, a new PPDU flag field 63, a reserved field 64, a receive (Rx) offset field 65, an Rx duration field 66, a transmit (Tx) offset field 67, and a Tx duration field 68. The AID field 61 identifies a station (STA) addressed by the frame. The TID field 62 defines the TID for transmissions by a STA. The new PPDU flag field 63 indicates that the downlink (DL) for the STA begins at the start of the PPDU. The Rx offset field 65 defines the start of the first symbol containing DL data for a STA. The Rx duration field 66 defines the length of a downlink. The Tx offset field 67 defines the time when transmissions by the STA may begin, and the Tx duration field 68 defines the duration limit of the transmissions.

FIG. 4 shows a typical power save aggregation descriptor (PSAD) frame 40. The PSAD frame 40 includes a frame control field 41, a duration field 42, an RA field 43, a TA field 44, a basic service set identifier (BSSID) field 45, a PSAD parameter (PARAM) field 46, a number of receivers field 47, and an FCS field 48. The PSAD PARAM field 46 further includes a reserved field 71, a More PSAD indicator 72, and a descriptor end field 73. The number of receivers field 47 includes a plurality of individual Station Info fields which further includes a reserved field 81, a STA ID field 82, a downlink transmission (DLT) start offset field 83, a DLT duration field 84, an uplink transmission (ULT) start offset field 85, and a ULT duration field 86.

An MMP/PSAD frame may be transmitted as a non-aggregate, or may be aggregated with downlink MPDUs. Since the MMP/PSAD frame format defines receiving and transmitting durations for each STA, it enables STAs to save power since the STA can go into sleep mode when it is not either receiving or transmitting. Also, since the MMP sequence is protected using a network allocation vector (NAV) and extended PHY protection (EPP), MMP provides a mechanism of scheduling multiple transmission opportunities (TXOPs).

FIG. 5A shows an MMP/PSAD Downlink frame exchange sequence 50, and FIG. 5B shows an MMP/PSAD Uplink frame exchange sequence 55. In PSAD, a downlink transmission (DLT) and an uplink transmission (ULT) period of time are described by the PSAD frame 40. Which period of time is intended to be used for the transmission of frames from/to the PSAD transmitter to one of the PSAD receivers is also described in the PSAD frame 40.

In particular, FIGS. 5A and 5B show the start offsets for DLT1 to DLTn, and ULT1 to ULTn. Similarly, in MMP, offsets are shown for a series of downlink transmissions RX1 to RXn and uplink transmissions TX1 to TXn.

Aggregation is also possible at the PHY-level layer for physical layer (PHY) protocol data units (PPDUs). This aggregation may be referred to as an aggregated PPDU (A-PPDU). An A-PPDU contains one or more pairs of PLCP headers and PPDUs or PHY service data units PSDUs. To form an A-PPDU, two or more PPDUs (or PSDUs) are aggregated together, separated by the High Throughput Signal (HT-SIG) field.

FIG. 6 shows a typical aggregated PPDU (A-PPDU) 60. The A-PPDU 60 includes a legacy preamble (L-Preamble) 91, a High-Throughput Preamble (HT-Preamble) 92, a plurality of PSDU fields 93 ($PSDU_1 \ldots PSDU_n$), and a plurality of HT-Signal (HT-SIG) fields 94 ($HT\text{-}SIG_1 \ldots HT\text{-}SIG_n$). An HT-SIG field 94 may also include a length field 95, an MCS field 96, an advanced coding field 97, a sounding packet 98, a number HT-Legacy Training Field (HT-LTF) 99, a Short GI field 101, a 20/40 field 102, a cyclic redundancy check (CRC) field 103, and a tail field 104.

As shown in FIG. 6, the resulting A-PPDU 60 is therefore the combination of all PPDUs (or PSDUs) in the A-PPDU along with HT-SIGs 94 for each constituent PSDU 93. Since each PSDU 93 shown in FIG. 6 is delimited by an HT-SIG 94 that defines the various physical layers parameters, the A-PPDU comprises multi-rate PSDUs.

One of the drawbacks to the current system, however, is that when an MMP/PSAD is transmitted by the AP, it is possible that one or more of the STAs associated with the MMP/PSAD will not correctly receive, or incorrectly decode the MMP/PSAD frame. In these cases, the STAs that do not correctly receive or decode the MMP/PSAD frame will miss their scheduled uplink transmission times, effectively wasting the WLAN medium time.

It would therefore be advantageous if a method and apparatus existed that served as a mechanism to recover the structure of the A-PPDU 90 if one or more HT-SIGs 94 or PSDUs 93 are received in error due to poor channel conditions. It would further be advantageous for a method and apparatus to exist wherein an AP recovers any unused ULT, can transmit multiple MMP/PSAD frames, and can schedule multicast and broadcast transmissions in MMP/PSAD frames.

SUMMARY

In a wireless communication system comprising at least one access point (AP) and a plurality of stations (STAs), a method for transmission management of the wireless medium comprises the AP configuring a Multiple Receiver Aggregate Multi-Poll/Power Save Aggregation Descriptor (MMP/PSAD) frame with scheduled Uplink Transmission Time (ULT) information for the plurality of STAs. The AP then transmits the MMP/PSAD frame to the plurality of STAs. Upon successfully receiving and decoding the MMP/PSAD frame, STAs transmit during their scheduled ULT.

A method and apparatus may be used in wireless communications. The apparatus may be an access point (AP), and may transmit a power save frame. The power save frame may include one or more Uplink (UL) Transmission Times (ULT)s. The apparatus may determine that a station (STA) did not transmit during its respective ULT. The AP may transmit another power save frame. The other power save frame may include a modified ULT. The modified ULT may be for a STA that did not transmit during its respective ULT. The other power save frame may include an unmodified ULT. The unmodified ULT may be for a STA that did not transmit.

A STA may receive a power save frame. The power save frame may include one or more ULTs. One of the ULTs may be a scheduled ULT for the STA. If the STA does not transmit during the scheduled ULT, the STA may receive another power save frame. The other power save frame may include a modified ULT for the STA. The STA may transmit packet data based on the modified ULT. The other power save frame may include an unmodified ULT for another STA.

BRIEF DESCRIPTION OF THE DRAWINGS

The foregoing summary, as well as the following detailed description of the preferred embodiments of the present invention will be better understood when read with reference to the appended drawings, wherein:

FIG. 1 shows an exemplary A-MSDU frame;

FIG. 2 shows an exemplary aggregated MPDU (A-MPDU) frame;

FIG. 3 shows a typical multiple receiver aggregate multi-poll (MMP) frame;

FIG. 4 shows a typical power save aggregation descriptor (PSAD) frame;

DETAILED DESCRIPTION OF THE PREFERRED EMBODIMENTS

Hereafter, a station (STA) includes but is not limited to a wireless transmit/receive unit (WTRU), user equipment (UE), mobile station, fixed or mobile subscriber unit, pager, or any other type of device capable of operating in a wireless environment. When referred to hereafter, an access point (AP) includes but is not limited to a base station, Node-B, site controller, access point or any other type of interfacing device in a wireless environment.

Figure 5A:
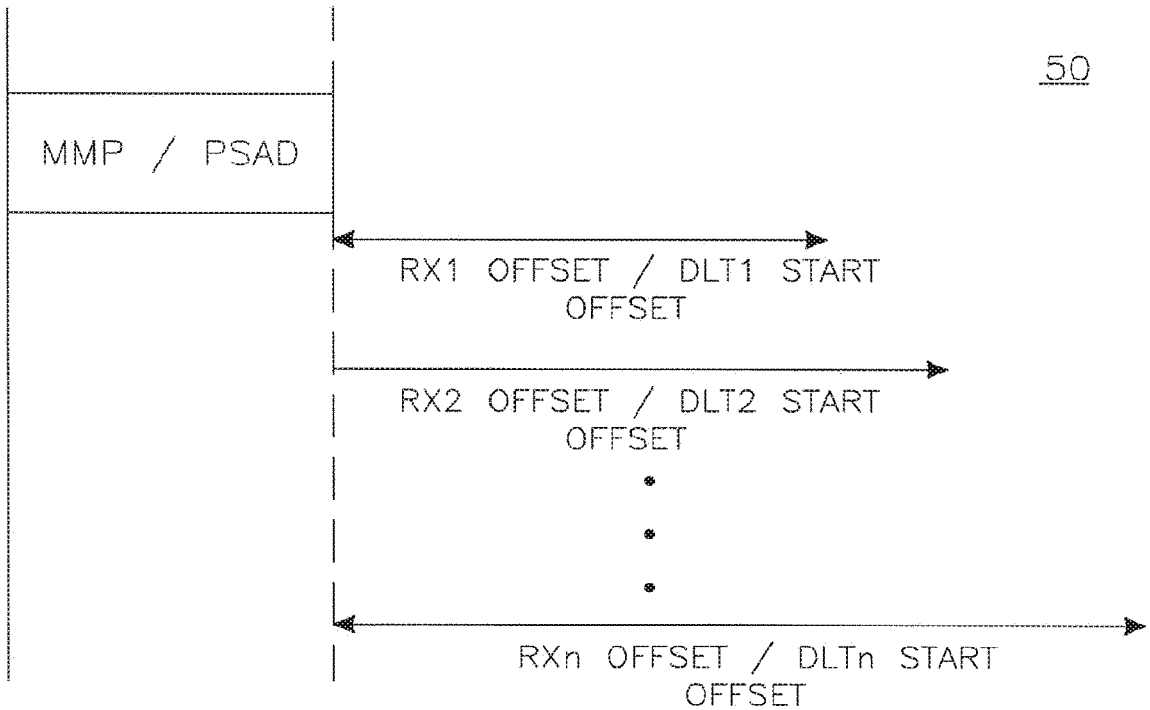
FIG. 5A shows an MMP/PSAD Downlink frame exchange sequence.
Figure 5B:
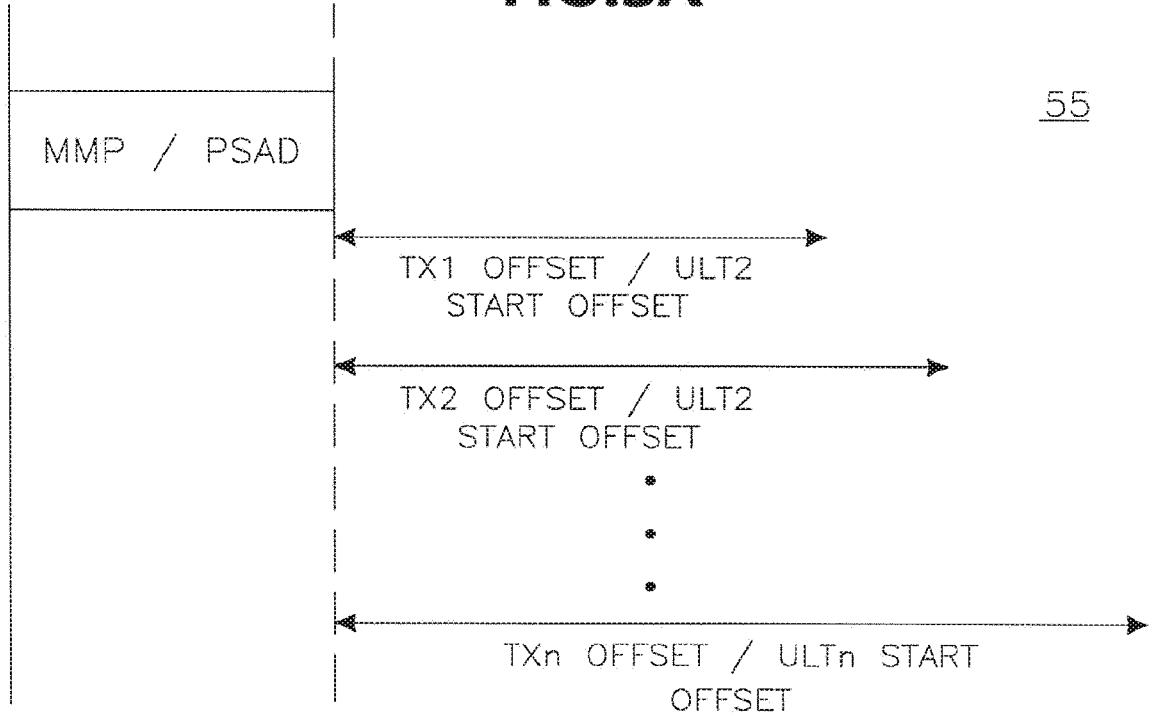
FIG. 5B shows an MMP/PSAD Uplink frame exchange sequence.
Figure 6:
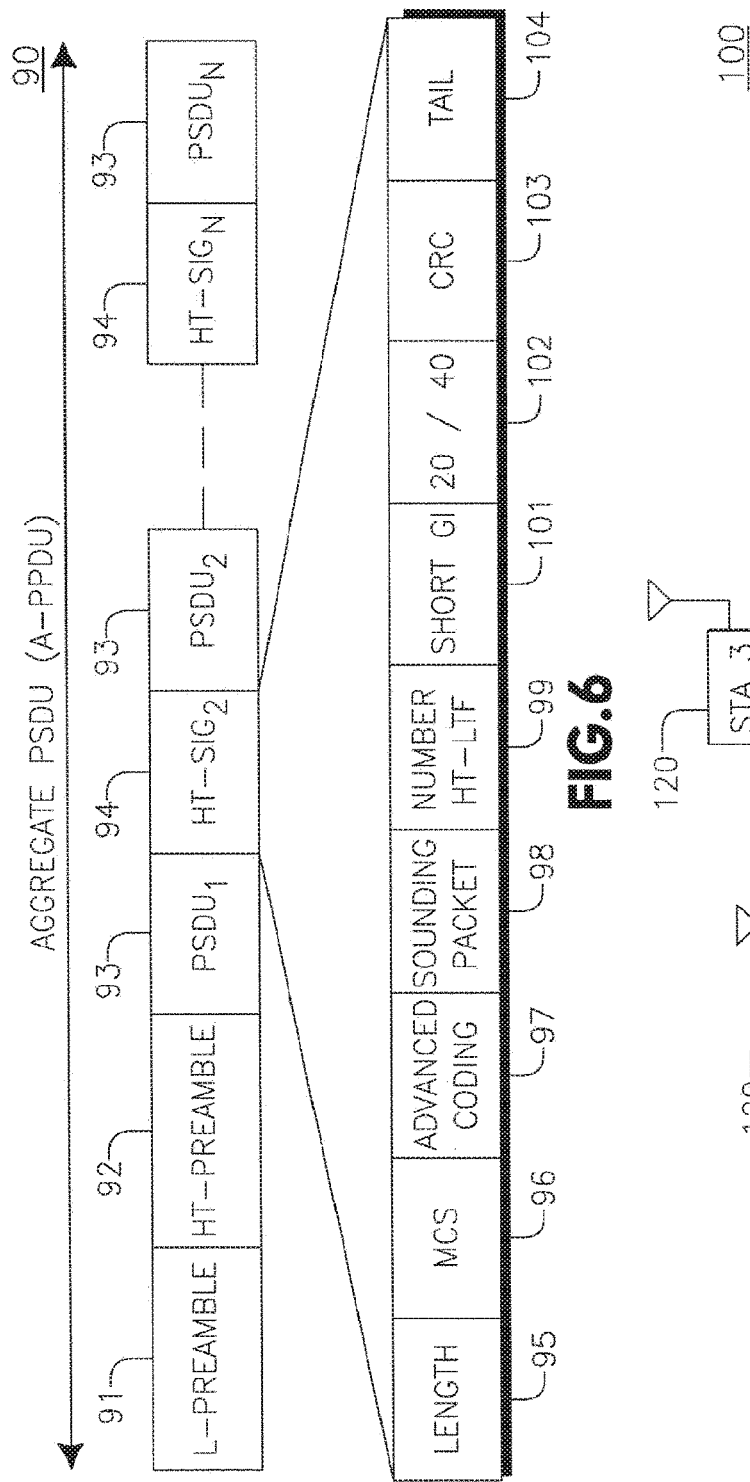
FIG. 6 shows a typical aggregated PPDU (A-PPDU)
Figure 7:
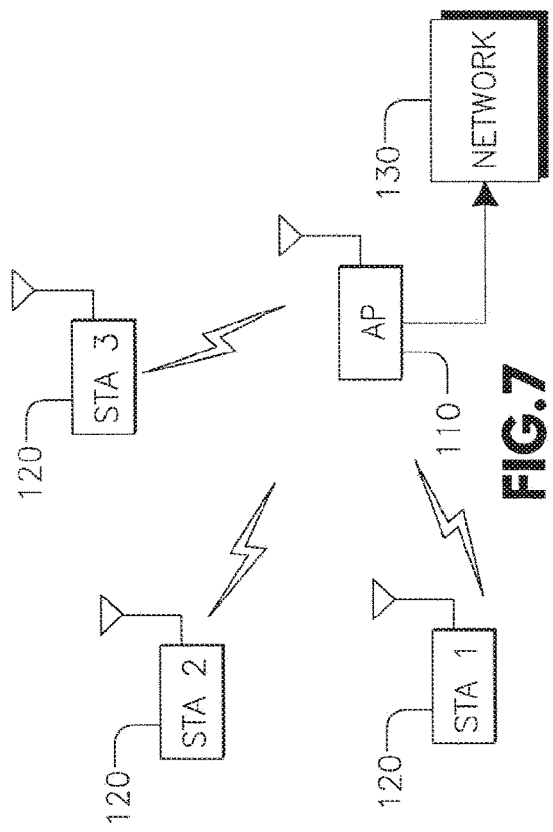
FIG. 7 shows a wireless communication system configured in accordance with the present invention.

FIG. 7 shows a wireless communication system 100 configured in accordance with the present invention. The wireless communication system 100 in a preferred embodiment may be a wireless local area network (WLAN), and includes an AP 110 and a plurality of STAs 120 (designated STA1, STA2, and STA3) capable of wireless communication with the AP 110. The AP 110, in a preferred embodiment, is connected to a network 130, such as the Internet, a public switched telephone network (PSTN), or the like. In this manner, the STAs 120 are provided access to the network 130 through the AP 110. Although only three STAs 120 are depicted in the wireless communication system 100, it should be noted that any number of STAs 120 may exist in the wireless communication system 100 and be in communication with the AP 110.

Figure 8:
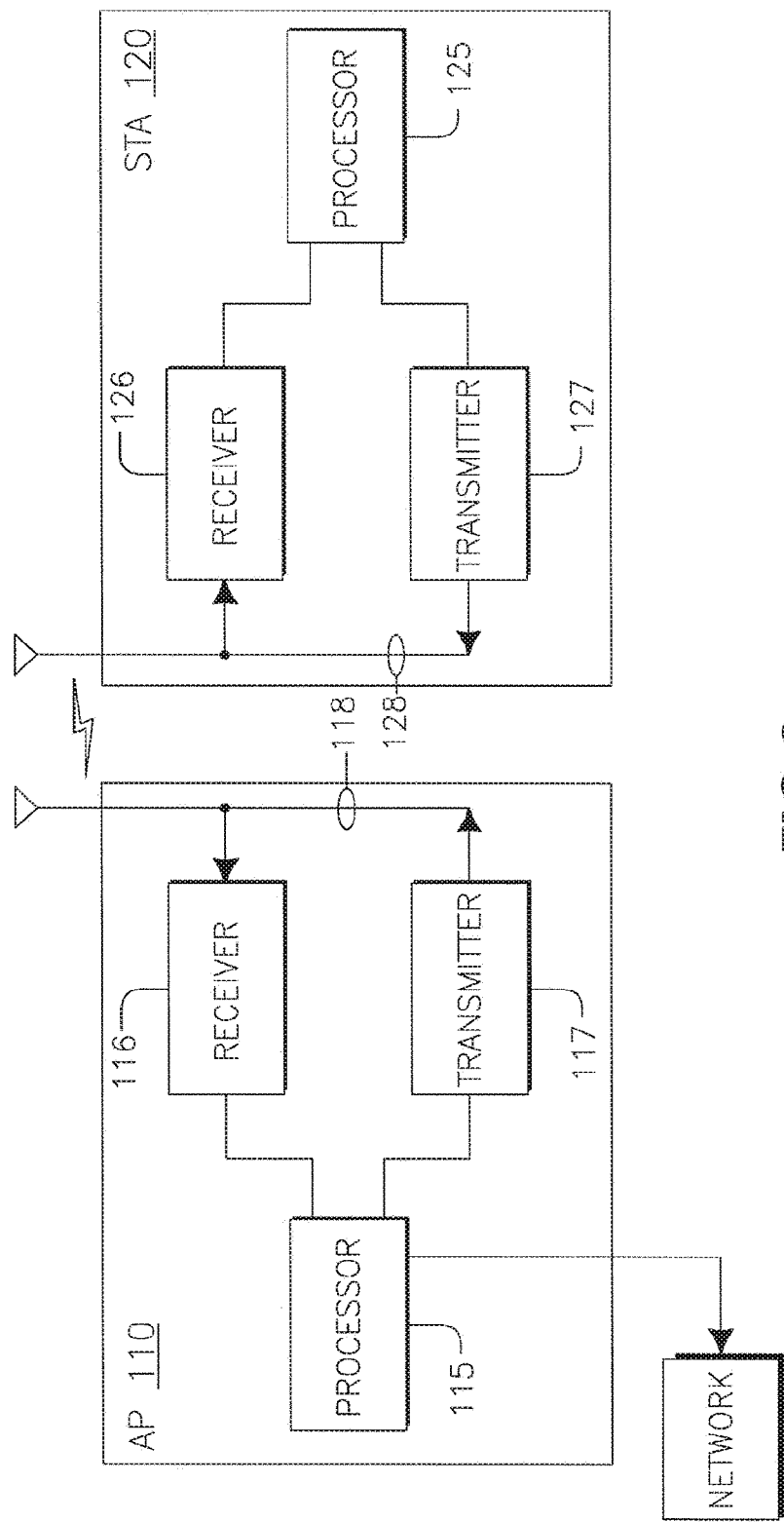
FIG. 8 is a functional block diagram of an AP and a STA configured to perform a method for transmission management, in accordance with the present invention.

FIG. 8 is a functional block diagram of an AP 110 in communication with a STA 120, configured to perform a method for transmission management in the wireless system 100.

In addition to the components normally included in a typical AP, the AP 110 includes a processor 115 configured to manage transmission in the wireless communication network 100, a receiver 116 in communication with the processor 115, a transmitter 117 in communication with the processor 115, and an antenna 118 in communication with the receiver 116 and the transmitter 117 in order to facilitate wireless transmission and reception. Additionally, in a preferred embodiment, the processor 115 is capable of communicating with the network 130.

In addition to the components normally included in a typical STA, the STA 120 includes a processor 125 configured to manage transmission in the wireless communication system 100, a receiver 126 in communication with the processor 125, a transmitter 127 in communication with the processor 125, and an antenna 128 in communication with the receiver 126 and the transmitter 127 in order to facilitate wireless transmission and reception.

Figure 9:
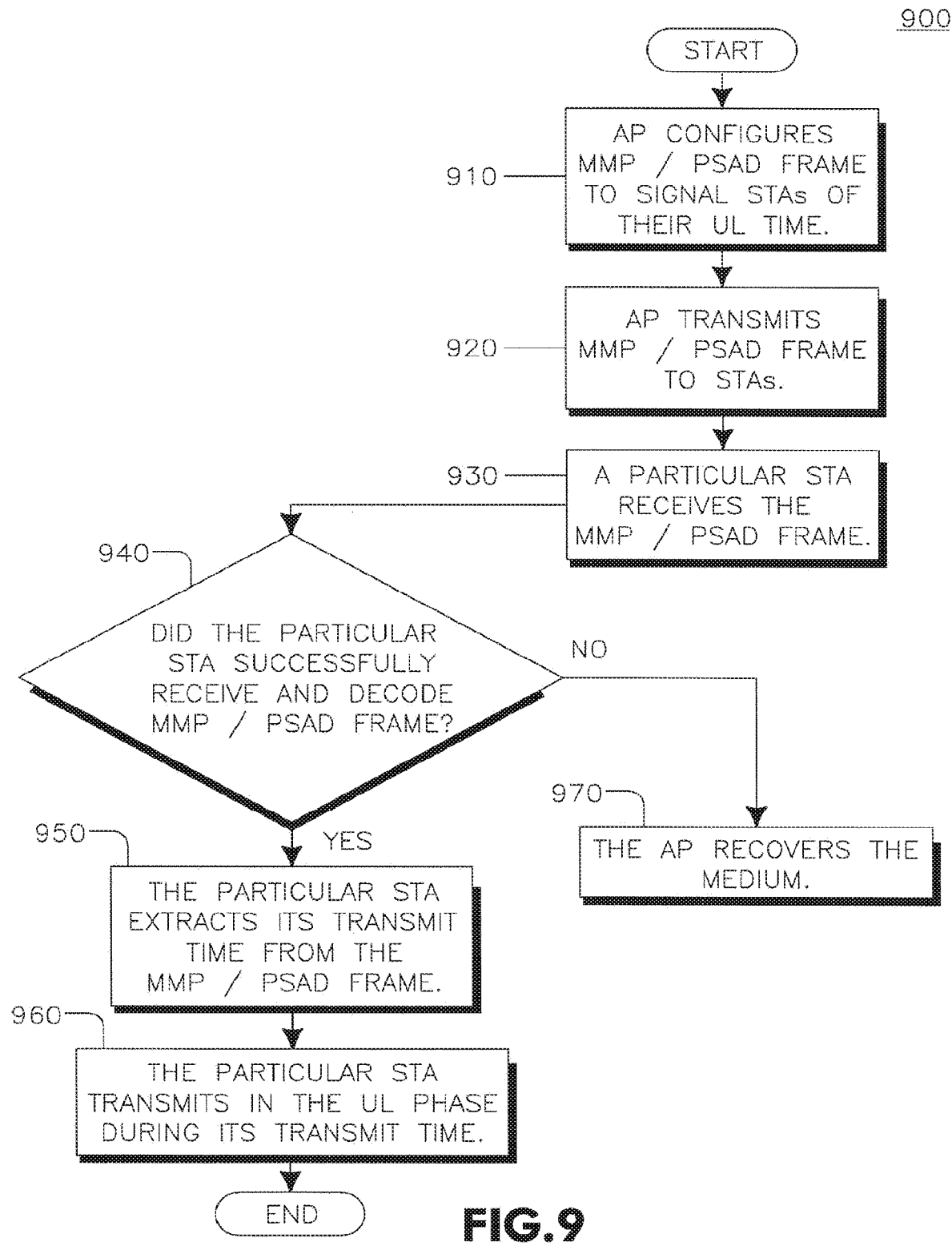
FIG. 9 is a flow diagram for managing transmission times in the wireless communication system of FIG. 7, in accordance with an embodiment of the present invention.

FIG. 9 is a flow diagram 900 for managing transmission times in the wireless communication system 100, in accordance with an embodiment of the present invention. In step 910, the AP 110 configures an MMP/PSAD frame in order to signal to STAs 120 their transmit times in the UL phase. Specifically, the MMP/PSAD frame schedules both downlink and uplink frame exchanges for a subsequent duration of time that is specified in the MMP/PSAD duration field. For example, the AP 110 may achieve this by arranging the order of PSAD descriptor fields (or the MMP Receiver Information fields) according to increasing values of the Rx/DLT Start Offset, or according to the order of transmission when the Rx/DLT Start Offset is equal. This is particularly useful if the AP 110 is sending an A-PPDU containing multiple PPDUs destined to multiple receiver STAs 120. Additionally, the AP 110 populates the TA field (34, 44) with its own identifier, such as its MAC address, and the RA field with addresses of intended receivers. In one embodiment, the RA field may be populated with the MAC addresses of the STAs 120 the MMP/PSAD frame is intended for.

The AP 110 then transmits the MMP/PSAD frame to the STAs 120 (step 920). Each particular STA 120 then receives the MMP/PSAD frame (step 930). If the particular STA 120 receives and decodes the MMP/PSAD frame successfully (step 940), the STA 120 extracts it transmit time from the MMP/PSAD frame (step 950). If the STA 120 does not successfully receive and decode the MMP/PSAD frame (step 940), then the AP 110 recovers the medium (step 970), which will be described in more detail below.

In one example, the STA 120 extracts timing information of the individual PPDUs that form the A-PPDU aggregate. A STA 120 that receives an MMP/PSAD frame can derive its HT-SIG time information from the Offset field and Duration field that are defined within the MMP/PSAD frame. Specifically, the Rx (or DLT) Start Offset and Duration fields are used for the purpose of extracting the HT-SIG timing information of an A-PPDU, thereby improving the reliability of the A-PPDU aggregation scheme. This may also allow a simple receiver implementation.

For purposes of example, it may be assumed that one of the aggregates within the MMP/PSAD exchange is an A-PPDU aggregate. For a STA 120 identified in the MMP/PSAD frame as having downlink data within the MMP/PSAD exchange, the immediately preceding station's MMP/PSAD Rx Offset and Rx Duration fields may be used in order to determine the starting time of its HT-SIG field. However, this sharing of Rx Offset information occurs only if both stations have the same Rx Offset. Otherwise, the Rx Offset of the particular STA 120 is used. Accordingly, by adding the Rx Offset and Rx Duration of the prior station, the particular STA 120 can determine when its PPDU HT-SIG will start.

Alternatively, the particular STA 120 can use multiple prior fields of the MMP/PSAD frame instead of only one prior field, such as only the information of the immediately prior station. This variation may be useful, for example, when the Rx Duration fields are not defined relative to a common Rx Offset, but rather in terms of the actual duration of the data PPDU. In this case, the particular STA 120 may need to perform an overall addition on the all previous Rx Duration fields.

In another alternative, a field or bit is added within the MMP/PSAD descriptor fields or the MMP Receiver Information fields. This field or bit differentiates whether the timing information is related to the start of an MPDU within an A-MPDU aggregate, or a PPDU within an A-PPDU aggregate. For example, this added field could be used to indicate that the particular STA 120 should expect to receive and decode an HT-SIG at this Rx Offset, a preamble training field, or an MPDU delimiter field.

If the A-PPDU is transmitted without the MMP/PSAD, it should be protected with a network allocation vector (NAV) setting or spoofing since the irregular error probability and error propagation can disrupt the power savings, medium access and NAV of other STAs 120 in the system. For example, an A-PPDU from the AP 110 can be preceded by a clear to send (CTS)-to-self transmission to provide NAV and/or EPP protection. An A-PPDU from a Non-AP STA 120 may be protected by an RTS/CTS exchange for NAV and EPP protection.

Once the STA 120 extracts its timing information (step 950), it then transmits during its transmit time in the UL phase (step 960).

Figure 10:
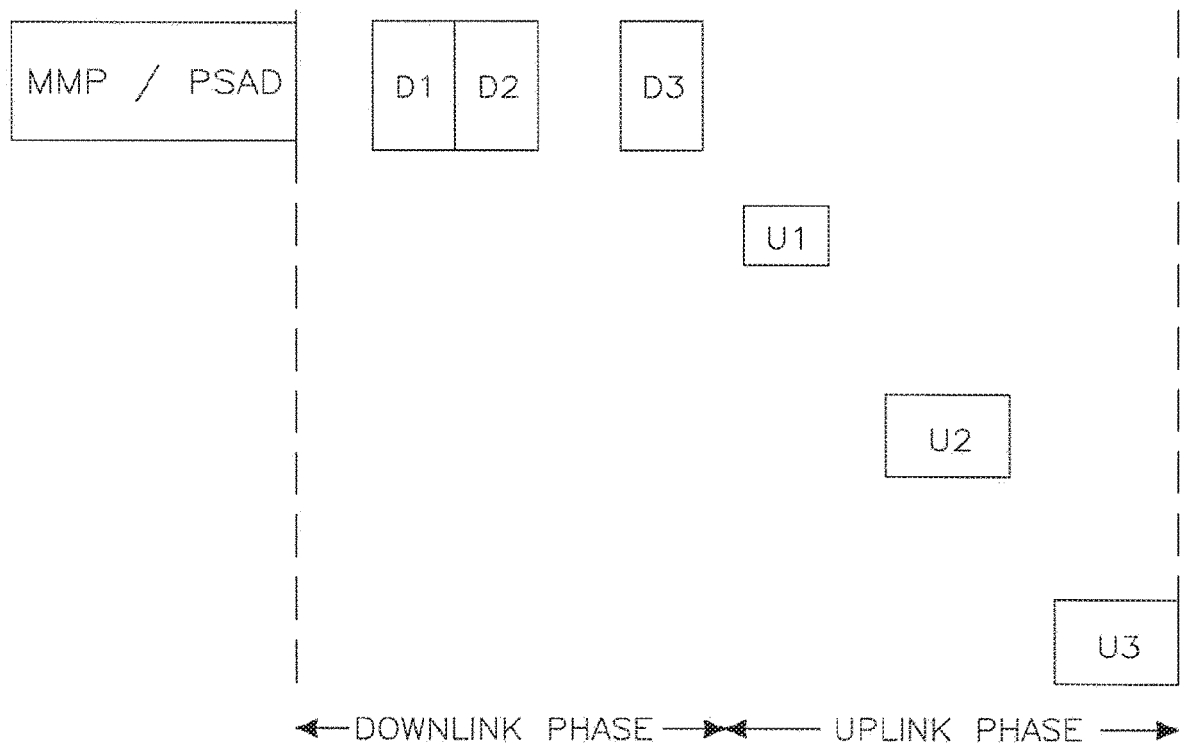
FIG. 10 is an exemplary signal diagram of a downlink and uplink exchange for the wireless communication system of FIG. 7, in accordance with an embodiment of the present invention.

FIG. 10 is an exemplary signal diagram 101 of a downlink and uplink exchange for the wireless communication system 100, in accordance with the method 900 described above. The AP 110 transmits the MMP/PSAD frame that includes the downlink and uplink scheduling information for STA1, STA2, and STA3. In the downlink phase, the AP 110 transmits the downlink information for STA1, STA2, and STA3 as indicated by D1, D2, and D3. If each STA 120 successfully received and decoded the MMP/PSAD frame, then each STA 120 (STA1, STA2, and STA3) receives its downlink information during its scheduled time as D1, D2, and D3, respectively. In the uplink phase, STA1 transmits during its scheduled uplink time (U1), STA2 transmits during its scheduled uplink time (U2), and STA3 transmits during its scheduled uplink time (U3). In this manner, each STA 120 knows when it needs to be active in order to receive downlink data associated with it or to transmit during its scheduled uplink time. Accordingly, each STA 120 can power down during times that it knows it is not scheduled to transmit or receive, thereby allowing it to conserve its energy.

Since the scheduling of uplink and downlink frame exchanges is scheduled in the MMP/PSAD frame, a STA 120 that does not successfully receive and decode the MMP/PSAD frame (step 940) will not be aware of its timing and may miss its transmission opportunity in the UL. Without any mechanism to prevent or recover this from happening, the medium time may be wasted. To prevent this from occurring, the AP 110 should recover the medium (step 970).

Figure 11:
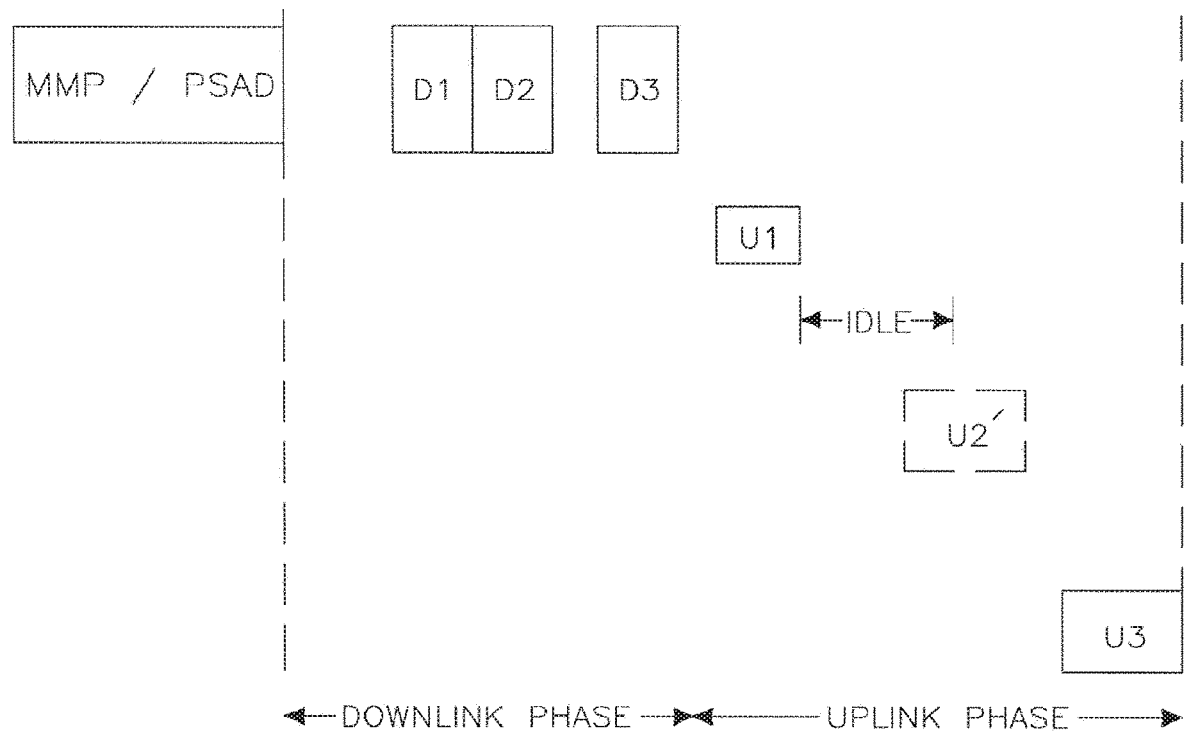
FIG. 11 is an exemplary signal diagram of a downlink and uplink exchange for the wireless communication system 100 where a particular STA did not successfully receive and decode its downlink and uplink scheduling information.

FIG. 11 is an exemplary signal diagram 101' of a downlink and uplink exchange for the wireless communication system 100 where a particular STA 120 (in this case STA2) did not successfully receive and decode its downlink and uplink scheduling information in step 940. Accordingly, STA2 does not transmit during its scheduled uplink time (U2').

Figure 12:
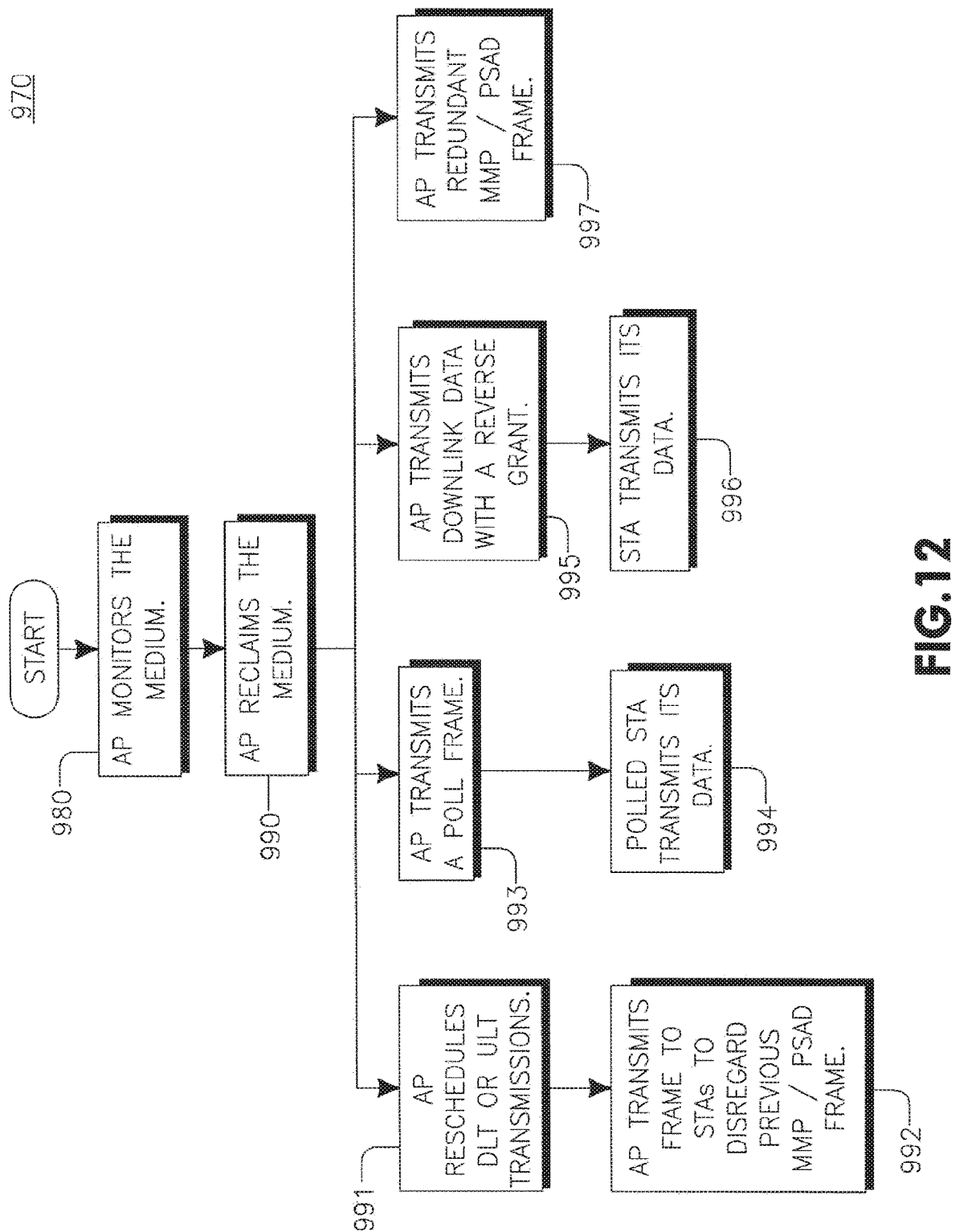
FIG. 12 is a flow diagram of a method of recovering the medium, in accordance with an embodiment of the present invention.

FIG. 12 is a flow diagram of a method of recovering the medium 970, in accordance with an embodiment of the present invention. In step 980, the AP 110 monitors the medium to detect whether or not particular STAs 120 are transmitting during their scheduled UL time. The AP 110 may utilize the timing information in the MMP/PSAD frame to determine when it should monitor the medium (step 980), or it may continuously monitor the medium.

If the AP 110 detects that a STA 120 is not conducting its uplink transmissions when scheduled, the AP 110 may reclaim the medium (step 990).

Referring again to FIG. 11, the AP 110 will monitor the Uplink Phase and detect that STA1 transmits its uplink data during its scheduled uplink window (U1). The AP 110 will then detect that STA2, for example, is not transmitting during its scheduled uplink transmit window (U2'). After waiting an idle period, AP 110 will reclaim the medium (step 990).

In a preferred embodiment, the idle period is a predetermined period that the AP 110 will wait to give a STA 120 an ample opportunity to begin transmitting during its uplink time, before the AP 110 reclaims the medium. As an example, the idle time period may be equal to the point control function inter-frame spacing (PIFS) period. The AP 110 may monitor the medium (step 980) during the MMP/PSAD exchange period if the AP 110 is not transmitting, or since the AP 110 may know the time periods in which each STA 120 is to be transmitting in the uplink, the AP 110 may only monitor the medium during those times.

Alternatively, the AP 110 may monitor the medium for frame errors or collisions that are occurring during the uplink phase, and base a decision as to reclaiming the medium on those observations. Additionally, the AP 110 may decide to cancel the MMP/PSAD in order to transmit or schedule data traffic that has a higher priority than what the AP 110 has already accounted for. For example, the AP 110 may wish to improve Quality of Service (QoS) requirements for particular traffic, or to schedule control traffic.

At any rate, once the AP 110 has decided to reclaim the medium in step 990, there are several ways by which it may do so.

One way in which the AP 110 may reclaim the medium is by rescheduling DLT or ULT transmissions (step 991). In a preferred embodiment, the AP 110 accomplishes this by transmitting a frame to indicate to all or selected STAs 120 that they should disregard the previously sent MMP/PSAD frame (step 992). This frame may have a number of formats.

For example, the frame transmitted in step 992 may be a newly defined frame to reset or cancel the prior MMP schedule, or any control, management or data frame that can be configured to indicate to the STAs 120 to reset prior MMP/PSAD schedules.

In one preferred embodiment, however, the AP 110 retransmits another MMP/PSAD frame. The MMP/PSAD frame may be the original MMP/PSAD frame, but containing a field that specifies that the previous scheduling information should be ignored by all, or selected, STAs 120. Alternatively, the MMP/PSAD frame may be identical to the previously sent MMP/PSAD frame, but with a defined rule specifying that if a STA 120 receives an MMP/PSAD frame, it is to disregard any scheduling information received from any prior MMP/PSAD frame.

A NAV duration of the new MMP/PSAD, or any frame used to cancel or reset the prior MMP/PSAD schedule, may be utilized to reset or update the NAV at the receiving STAs 120. Another frame, such as a CF-END frame could also be used to reset the NAV durations of the STAs 120. Alternatively, the wireless communication system 100 may be configured such that the duration of the most recent MMP/PSAD frame supersedes any locally stored NAV durations at the STAs 120.

Another way in which the AP 110 may reclaim the medium is by transmitting a poll frame to the STA 120 that is not transmitting during its scheduled transmit time (step 993). The poll frame may include a contention free poll (CF-Poll), a QoS Poll, another MMP/PSAD frame, or the like. Alternatively, the AP 110 may transmit the poll frame to a different STA 120 than the scheduled STA for uplink transmission. The STA 120 that receives the poll frame will then begin transmitting in response to the poll frame (step 994). If the STA 120 has data to transmit, then it will transmit the data. Otherwise it will transmit an acknowledgement frame, a QoS Null, a Data Null, or another frame to indicate that it does not have any data to transmit.

Yet another way the AP 110 may reclaim the medium is by transmitting downlink data and, in a preferred embodiment, a reverse direction grant (RDG) signal, as in step 995. For example, the AP 110 may send downlink data to any STA 120 that it desires, or the AP 110 may transmit any control or management frame during this period. Upon receiving the downlink data and RDG signal, the receiving STA transmits its uplink data for its time duration (step 996). Even if the AP 110 does not possess any downlink data to transmit, it may still transmit a Data Null, QoS Null, or the like, to indicate to the non-transmitting STA that it should begin transmitting for its specified duration.

For example, referring back to FIG. 11, if the AP 110 detects that the medium is idle for too long after STA1's uplink transmission (U1) time, then AP 110 transmits downlink data and an RDG to STA2. Upon receiving the downlink data and RDG, STA2 transmits its data for its specified duration (U2').

If the STA 120 does not have data to transmit in the uplink, the STA 120 should transmit a response frame to the AP 110 such as a QoS Null frame, a Data Null frame, or the like, to indicate to the AP 110 that the STA does not have data to transmit during its allotted uplink time. The AP 110 can thereby reclaim the medium and take some other remedial action to avoid wasting the medium, such as polling another STA 120 to begin its transmission.

Another way that the AP 110 may reclaim the medium is by transmitting a redundant MMP/PSAD frame (step 997). The redundant MMP/PSAD frame may repeat some or all of the ULT information during the time when a STA 120 misses its transmission window in the uplink phase. This is particularly useful if more than one STA 120 did not receive or decode the MMP/PSAD frame successfully. The AP 110 may also decide to utilize a redundant MMP/PSAD frame if it detects certain events occurring in the wireless communication system 100 during a previous MMP/PSAD exchange sequence, or because the AP 110 possesses particular knowledge about the ULT information or number of STAs 120, that would make it appropriate to transmit a redundant MMP/PSAD.

For example, the AP 110 may have detected in a previous MMP/PSAD frame exchange that certain STAs 120 did not transmit their information during their scheduled uplink times. In this case, the AP 110 may determine that in the next MMP/PSAD exchange, it will transmit a redundant MMP/PSAD frame to enhance the probability that all STAs 120 will properly receive their scheduled ULTs.

Additionally, the AP 110 may know that there are a large number of STAs 120 in the wireless communication system 100, and therefore, the probability of any particular STA 120 failing to receive its ULT information in the first MMP/PSAD is increased. Similarly, the AP 110 may have knowledge relating to extensive ULTs scheduled for the STAs 120 in the wireless communication system 100, meaning that if one STA 120 failed to receive the first MMP/PSAD, a large amount of wasted bandwidth can occur if that STA fails to transmit during its scheduled ULT. In these scenarios, transmitting a redundant MMP/PSAD frame enhances the probability that all the STAs 120 in the system will utilize their scheduled ULTs, eliminating wasted bandwidth. Essentially, the AP 110 may utilize a comparison of the duration of individual ULTs, the total duration of all ULTs, and the number of STAs 120 having ULTs against pre-determined thresholds to decide whether or not a redundant MMP/PSAD frame should be transmitted.

Referring again to FIG. 11, suppose that not only STA2 failed to successfully receive and decode the MMP/PSAD frame, but STA3 failed as well. In this case, both STA2 and STA3 would miss their scheduled transmission times without remedial action by the AP 110. Therefore, if the AP 110 were to detect an idle period for too long after the uplink transmission (U1) of STA1, then the AP 110 transmits a redundant MMP/PSAD frame. In this way, STA3 receives the redundant MMP/PSAD frame and transmits its data during its scheduled uplink window (U3), thus limiting further waste of the medium.

In yet another alternative embodiment of the present invention, the AP 110 may schedule a broadcast or multicast frame utilizing the MMP/PSAD frame. In order to do this, the AP 110 must reconfigure the existing PSAD frame 40 of the MMP/PSAD frame, since the current format specifies that the STA ID field 82 is the Association ID of the STA 120. Therefore, to support transmitting a broadcast or multicast frame within the MMP/PSAD sequence, the existing PSAD frame 40 should be reconfigured.

One way to reconfigure the PSAD frame 40 is to include a bit or a field within the MMP/PSAD frame. In a preferred embodiment, this is included in the Station Info field. For example, a bit may be included in the Reserved field 81 of the Station Info field, specifying that a broadcast frame will be transmitted at specified DLT parameters, and that STAs should remain awake during that duration. Alternatively, specific values for the STA ID field 82, for example all "1's", may be utilized to indicate that a broadcast frame will be transmitted and that STAs should remain awake during the duration. That is, the STA ID field 82 should have all bits set to "1".

Figure 13:
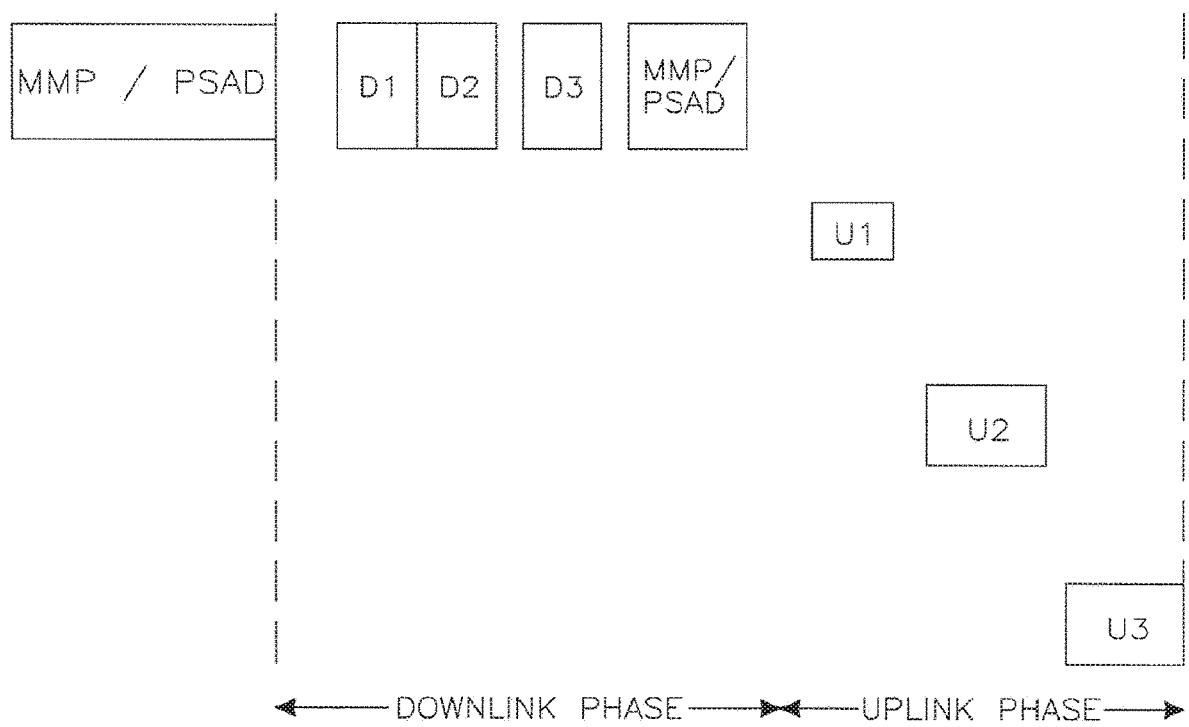
FIG. 13 is an exemplary signal diagram of a downlink and uplink exchange for the wireless communication system, showing a broadcast or multicast MMP/PSAD transmitted during a broadcast phase of the downlink phase.

FIG. 13 is an exemplary signal diagram 131 of a downlink and uplink exchange for the wireless communication system 100, where a broadcast or multicast MMP/PSAD is transmitted during a broadcast phase of the downlink phase. In the present example, the AP 110 transmits the first MMP/PSAD prior to the downlink phase that indicates to some or all STAs 120 that they should listen during a broadcast interval that will occur at the end of the downlink phase. At the end of the downlink phase, the AP 110 may then transmit a frame, and preferably an additional MMP/PSAD frame to confirm the ULT schedules. In this manner, the STAs 120 will have received their ULT schedules twice and therefore be less likely to miss their uplink transmission time.

Alternatively, the AP 110 may insert a second MMP/PSAD frame with the first MMP/PSAD frame exchange sequence by including a unicast MMP/PSAD entry in the first MMP/PSAD frame that describes the Tx Start Offset and the Tx Duration for when the second MMP/PSAD frame is to be transmitted. As an example, the entry may include any MAC address of any STA 120 as a dummy receiver address. This entry may also include inaccurate Tx Start Offset and Tx Duration information. At the end of the downlink phase, the AP 110 may then transmit a frame, and preferably an additional MMP/PSAD frame to confirm the ULT schedules. In this manner, only STAs 120 that have not successfully received and decoded the first MMP/PSAD will remain awake, or wake up, to receive and decode the second MMP/PSAD frame, while those stations that successfully received and decoded the first MMP/PSAD frame will not need to wake up to receive and decode the second MMP/PSAD frame. This is because those STAs 120 that successfully receive and decode the first MMP/PSAD frame will know that the second MMP/PSAD frame was not meant for them. Alternatively, no information relating to the second MMP/PSAD frame may be transmitted in the first MMP/PSAD frame.

Figure 14:
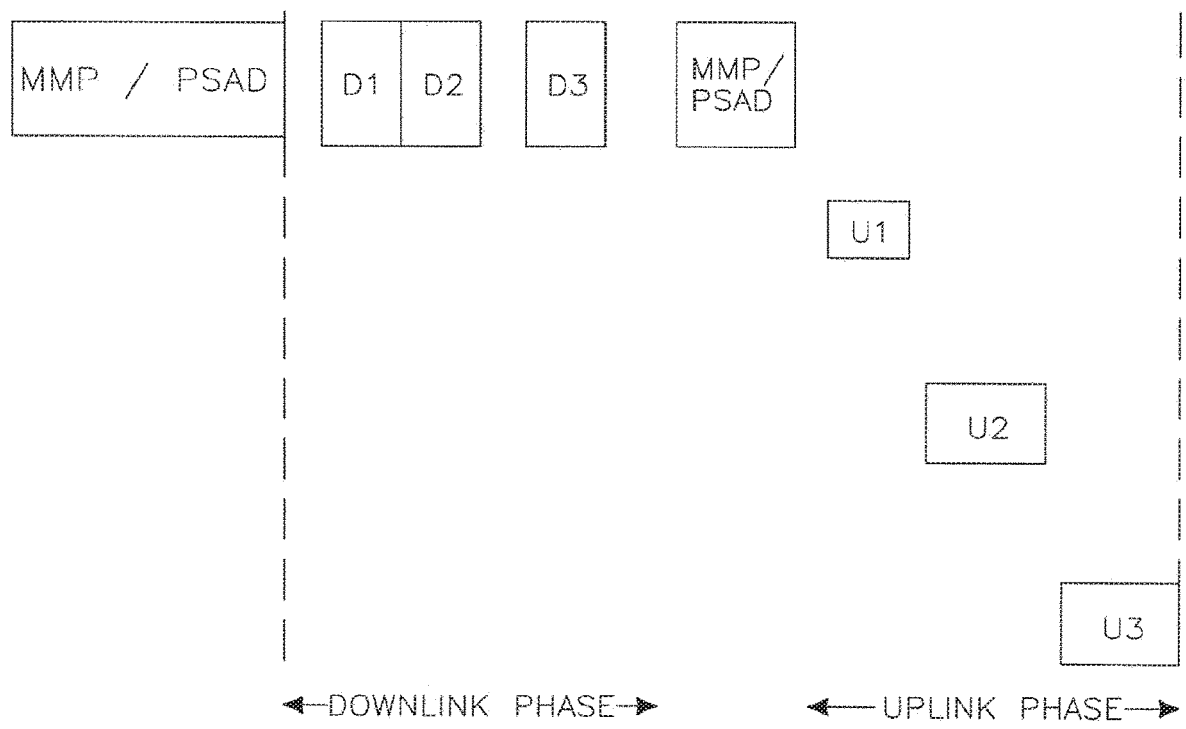
FIG. 14 is an exemplary signal diagram of a downlink and uplink exchange for the wireless communication system, showing a broadcast or multicast MMP/PSAD transmitted between the downlink and uplink phases.

FIG. 14 is an exemplary signal diagram 141 of a downlink and uplink exchange for the wireless communication system 100, where a broadcast or multicast MMP/PSAD is transmitted between the downlink phase and the uplink phase. In this example, the AP 110 inserts a second MMP/PSAD frame within the first MMP/PSAD frame, but does not include any entry in the first MMP/PSAD frame to describe the second one. The AP 110 then transmits the second MMP/PSAD frame to confirm the ULT schedules in an interval between the downlink phase and the uplink phase, as shown in FIG. 14. In this scenario, only STAs 120 that did not successfully receive and decode the first MMP/PSAD frame will awaken to receive the second MMP/PSAD frame since those that did successfully receive and decode the first MMP/PSAD frame will not awaken until they need to based on their successful decoding of the first MMP/PSAD frame.

Importantly, however, it should be noted that the AP 110 should account for the effect of the inserted, or nested, MMP/PSAD frame during its ULT Offset and Duration calculations. Otherwise, the AP 110 will be out of synchronization with the Offsets that the STAs 120 believe they are required to adhere to.

This nested, or redundant MMP/PSAD frame, may or may not contain identical information to the first MMP/PSAD frame. In a preferred embodiment, however, it will contain the ULT information for the STAs 120, and will typically contain consistent information with that of the first MMP/PSAD frame. That is, the second MMP/PSAD frame should contain the same scheduling information that was contained in the first MMP/PSAD frame.

Although in previous embodiments, the AP 110 is described as monitoring the medium in order to determine whether or not to reclaim it, STAs 120 may also monitor the medium in order to further improve system performance. Typically, the STAs 120 that receive their ULT schedule information in the MMP/PSAD frame do not perform sensing of the medium. They simply blindly begin their transmissions at their scheduled ULT. However, in some instances, it may be desirable to have the STAs 120 monitor the medium instead of, or in addition to, the AP 110. In one embodiment, a STA 120 may monitor the medium for any idle periods. If the STA 120 detects an idle period lasting beyond a pre-determined threshold, that STA may then transmit its uplink transmission during the remaining ULT duration, thereby avoiding collisions with other STAs ULTs, while maximizing use of the medium.

Although FIG. 1 only depicts one AP 110, it is also possible for several APs to be present in a wireless communication system. In this case, some STAs in the wireless communication system may be associated with one AP, while other STAs may be associated with other APs, which could cause some difficulty. In one scenario, one of the APs (AP1) may be associated with an Overlapping Basic Service Set (OBSS) or a co-channel BSS to another AP (AP2). If AP1 were to transmit an MMP/PSAD frame, STAs associated with AP2 may ignore the MMP/PSAD frame after receiving it because they will not see in the RA field any address that would indicate to them that the frame is intended for them, and go into a sleep state. If AP2 then transmits traffic during that time, the intended STAs will not receive the information because they will have been asleep during the transmission.

Accordingly, the STAs 120 receiving an MMP/PSAD frame may be configured to read the TA field in the frame to determine if the MMP/PSAD frame was sent from an AP with which the STA is associated. If the STA determines that the AP address in the TA field is the address of the AP the STA is associated with, then the STA can decode downlink transmissions and perform uplink transmissions in accordance with the contents of the MMP/PSAD frame, while going into sleep mode at other times. Conversely, if the STA determines that the AP transmitting the MMP/PSAD frame is not the AP the STA is associated with, it may ignore the frame, but still remain in an awake state to receive any transmission that might be sent from its associated AP. Additionally, however, the STA may desire to read the Duration ID value in an MMP/PSAD frame and update its NAV Duration, even if the frame was not sent by an associated AP. In this manner, the STA will know when the medium will be in use, and will be able to avoid transmitting during those times.

In another alternative embodiment of the present invention, the MMP/PSAD frame may be utilized to poll certain types of packets, such as Block Acknowledgement (BA) response frames. In this case, the AP 110 may utilize one or more flags within the MMP/PSAD frame indicating to specified STAs 120 that they transmit their BA response frames during their scheduled ULTs. The flag may further indicate to the STAs 120 whether or not they are to transmit only BA response frames during their scheduled ULT, or if they are to transmit BA response frames along with other frames the STA is transmitting. This alternative facilitates the addition of a new mode for BA to the currently existing modes.

Currently, the existing BA modes include Immediate Block ACK and Delayed Block ACK. In Immediate Block ACK mode, a STA responds to a BA request (BAR) immediately following an SIFS delay. In Delayed Block ACK mode, a STA decides on its own when to transmit a BA frame.

The present alternative embodiment includes polling for a Delayed BA, as opposed to the BA being transmitted at an arbitrary time by the STA. For example, the AP 110 may transmit a BAR to the STA 120 indicating to the STA 120 that the STA 120 should prepare the BA packet, or BA frame, and only transmit the packet when the STA 120 receives another poll message from the AP 110. The poll message may be in the form of an MMP or another packet transmitted by the AP 110. This provides for the AP 110 to determine the time for associated STAs 120 to transmit their BA frames instead of having the STAs themselves determine when to transmit them.

The above features may be implemented in a wireless transmit/receive unit (WTRU), base station, and/or peer-to-peer devices. The above methods are applicable to a physical layer and/or a data link layer. The applicable forms of implementation include application specific integrated circuit (ASIC), middleware, and software. This invention can be applied in an OFDM/MIMO system and a IEEE 802.11 compliant system.

Additionally, the features of the embodiments of the present invention may be implemented in a variety of manners, such as in an application running on a WTRU, such as an AP or STA. The features may also be incorporated into an integrated circuit (IC) or be configured in a circuit comprising a multitude of interconnecting components. Additionally, the features may be performed by a software application that runs on an IC, or by a software application that runs on a processor.

Although the features and elements of the present invention are described in the preferred embodiments in particular combinations, each feature or element can be used alone (without the other features and elements of the preferred embodiments) or in various combinations with or without other features and elements of the present invention.

What is claimed is:

1. A station (STA) comprising:
    a transceiver configured to receive, from an access point (AP), a first indication of a first uplink transmission time (ULT) associated with the STA during which the STA is assigned to transmit uplink data to the AP;
    the transceiver configured to receive, from the AP during the first ULT, a second indication of a modified ULT associated with the STA during which the STA is assigned to transmit uplink data to the AP; and
    the transceiver configured to transmit multiple uplink medium access control (MAC) data packets to the AP during the modified ULT associated with the STA.

2. The STA of claim 1, further comprising:
    a processor configured to enter a sleep mode after the transceiver transmits multiple uplink medium access control (MAC) data packets to the AP during the modified ULT associated with the STA.

3. The STA of claim 1, further comprising:
    a processor configured to enter a sleep mode when there is no ULT assigned to the STA.

4. The STA of claim 1, further comprising:
    a processor configured to receive the second indication when the STA is unable to transmit uplink data to the AP during the first ULT assigned to the STA.

5. The STA of claim 1, wherein the first indication is received in a control frame.

6. The STA of claim 1, wherein the first indication is received in a management frame.

7. The STA of claim 1, wherein the first indication indicates a second uplink transmission time (ULT) associated with a second STA during which the second STA is assigned to transmit uplink data to the AP.

8. The STA of claim 7, wherein the second indication indicates the second ULT associated with the second STA, and the second ULT of the second indication is unchanged as compared to the second ULT of the first indication.

9. The STA of claim 1, wherein the transceiver is configured to receive the second indication after a point control function inter-frame spacing (PIFS) period after the start of the first ULT.

10. The STA of claim 1, wherein the transceiver is further configured to receive, with the first indication of the first ULT associated with the STA, an indication of a type of data permitted to be transmitted during the ULT associated with the STA.

11. A method for use in a station (STA), the method comprising:
    receiving, from an access point (AP), a first indication of a first uplink transmission time (ULT) associated with the STA during which the STA is assigned to transmit uplink data to the AP;
    receiving, from the AP during the first ULT, a second indication of a modified ULT associated with the STA during which the STA is assigned to transmit uplink data to the AP; and
    transmitting multiple uplink medium access control (MAC) data packets to the AP during the modified ULT associated with the STA.

12. The method of claim 11, further comprising:
    entering a sleep mode after transmitting multiple uplink medium access control (MAC) data packets to the AP during the modified ULT associated with the STA.

13. The method of claim 11, further comprising:
    entering a sleep mode when there is no ULT assigned to the STA.

14. The method of claim 11, further comprising:
    receiving the second indication when the STA is unable to transmit uplink data to the AP during the first ULT assigned to the STA.

15. The method of claim 11, wherein the first indication is received in a control frame.

16. The method of claim 11, wherein the first indication is received in a management frame.

17. The method of claim 11, wherein the first indication indicates a second uplink transmission time (ULT) associated with a second STA during which the second STA is assigned to transmit uplink data to the AP.

18. The method of claim 17, wherein the second indication indicates the second ULT associated with the second STA, and the second ULT of the second indication is unchanged as compared to the second ULT of the first indication.

19. The method of claim 11, further comprising:
    receiving the second indication after a point control function inter-frame spacing (PIFS) period after the start of the first ULT.

20. The method of claim 11, further comprising:
    receiving, with the first indication of the first ULT associated with the STA, an indication of a type of data permitted to be transmitted during the ULT associated with the STA.

* * * * *